United States Patent [19]

Fudono

[11] Patent Number: 5,708,318
[45] Date of Patent: Jan. 13, 1998

[54] AC GENERATOR

[75] Inventor: Kiyoshi Fudono, Kariya, Japan

[73] Assignee: Denso Corporation, Kariya, Japan

[21] Appl. No.: 796,952

[22] Filed: Feb. 7, 1997

[30] Foreign Application Priority Data

Feb. 9, 1996 [JP] Japan ................. 8-023533

[51] Int. Cl.$^6$ ............... H02K 5/24; H02K 1/22
[52] U.S. Cl. ............................ 310/263; 310/51
[58] Field of Search ............................ 310/51, 263

[56] References Cited

U.S. PATENT DOCUMENTS

| | | | |
|---|---|---|---|
| 2,470,596 | 5/1949 | Winther et al. | 310/263 |
| 3,004,181 | 10/1961 | Noddin | 310/263 |
| 3,184,625 | 5/1965 | Farison | 310/263 |
| 3,226,581 | 12/1965 | Brewster et al. | 310/263 |
| 3,271,606 | 9/1966 | Collins | 310/263 |
| 3,714,484 | 1/1973 | Habert | 310/263 |
| 4,201,930 | 5/1980 | Inagaki et al. | 310/263 |
| 4,972,114 | 11/1990 | Frister | 310/263 |
| 5,270,605 | 12/1993 | Lefrancois et al. | 310/263 |

FOREIGN PATENT DOCUMENTS

| | | |
|---|---|---|
| 61-135350 | 6/1986 | Japan . |
| 5-091702 | 4/1993 | Japan . |
| 2260860 | 4/1993 | United Kingdom ............ 310/263 |

*Primary Examiner*—Clayton E. Laballe
*Attorney, Agent, or Firm*—Cushman, Darby, & Cushman; IP Group of Pillsbury, Madison & Sutro LLP

[57] ABSTRACT

An AC generator includes a rotor composed of a pair of generally cylindrical pole cores each having a plurality of claw poles. The claw poles have first and second chamfers disposed respectively on both leading and trailing sides thereof. A ratio b/a between a circumferential width a of the first chamfer and a circumferential width b of the second chamfer is in a range from 2.5 to 5.0, and a chamfered angle θr° of the second chamfer is in a range from 60° to 75°.

4 Claims, 5 Drawing Sheets

AC GENERATOR

CROSS REFERENCE TO RELATED APPLICATION

The present application is based on and claims priority from Japanese Patent Application No. Hei 8-23533, filed on Feb. 9, 1996, the contents of which are incorporated herein by reference.

BACKGROUND OF THE INVENTION

1. Field of the Invention

The present invention relates to an AC generator composed of a Lundell type rotor having claw poles, particularly an alternator for a vehicle.

2. Description of the Related Art

In general, an alternator for a vehicle having a Ludell type rotor which has a plurality of claw poles with a structure for reducing the magnetic noise generated due to a steep change of the magnetic flux supplied by the rotor through the claw poles.

For example, U.S. Pat. No. 3,271,606 discloses a rotor having a plurality of claw poles, the trailing edge of which are chamfered to reduce the magnetic noise.

JPA 61-135350 proposes a rotor having a plurality of claw poles both edges of which are chamfered.

JPA 5-91702 proposes a rotor having a plurality of claw poles the trailing edges of which have skew surfaces in addition to the chamfered edges of the claw poles on both sides thereof.

In order to provide such chamfered edges or skew surfaces as described above, it is necessary to machine the rotor or the pole cores additionally after the rotor is assembled or the pole core is formed by forging, resulting in a high production cost.

SUMMARY OF THE INVENTION

A main object of the present invention is to provide a rotor which is provided with chamfered edges without additional machining.

Another object of the present invention is to provide claw poles which can reduce the magnetic noise without significant reduction of the output power.

Another object of the present invention is to provide claw poles having the chamfered edges which can be made by forging.

An AC generator, according to the present invention, has a pair of generally cylindrical pole cores each having a plurality of claw poles, and the claw poles have first and second chamfers disposed respectively on both leading and trailing sides thereof. The circumferential width a of the first chamfer and the circumferential width b of the second chamfer are designed to have a ratio b/a which is in a range from 2.5 to 5.0, and the chamfered angle $\theta r°$ of the second chamfer is in a range from 60° to 75°.

In an AC generator as defined above, the first and second chamfers of the pole cores are preferably disposed in a slightly frusto-conical profile tapering to bases of the claw poles.

In an AC generator as defined above the claw poles preferably have trapezoidal surface, and the first and second chamfers are wider at portions nearer the base portion of the claw poles.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiments of the present invention are described with reference to the appended drawings.

Figure 2:
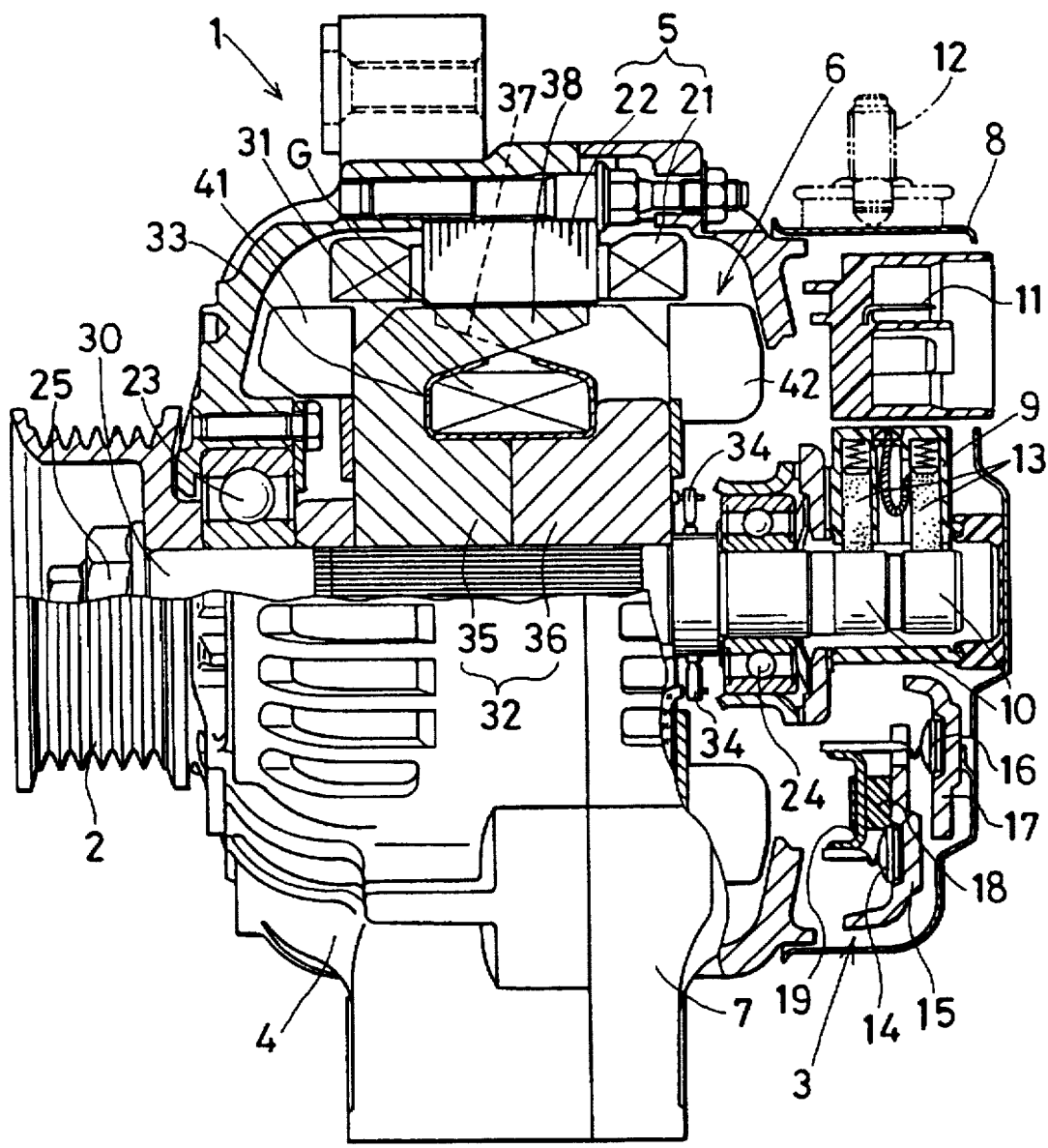
FIG. 2 is a cross-sectional view illustrating an alternator for a vehicle having the claw poles according to the embodiment of the present invention.

In FIG. 2, an alternator 1 for a vehicle is driven by an engine (not shown) through a V-ribbed pulley 2 and generates AC power, which is converted by a rectifier 3 to DC power to be supplied to a battery and other electric loads (not shown) of a vehicle. The alternator 1 is composed of a drive frame 4, a rotor 6 having a shaft 30, a rear frame 7 and a rear cover 8.

A pair of slip rings 10 is carried by the shaft 30 and a brush holder 9 is disposed around the slip rings so that a pair of brushes 13 are in contact with the slip rings respectively and fixed to the rear frame 7.

The rectifier 3 is connected to an output terminal 12 which is fixed to the rear cover 8. The rectifier 3 is composed of three plus diodes 14 held on a plus side cooling fin 15, three minus diodes 16 held on a minus-side cooling fin 17 and a terminal plate 18 which has a plurality of terminals 19 connecting a stator winding 21, the plus diodes 14 and minus diodes 16.

The stator 5 is composed of the Y or $\Delta$ type three-phase winding 21 and a stator core 22 supported by the drive frame 4. The three phase winding 21 generates three-phase AC output power when the rotor 6 rotates and supplies a rotating magnetic flux thereto.

The rotor 6 is composed of the shaft 30, a rotor coil 31 and a pair of Lundell type pole cores 32 carried on the shaft 30.

The shaft 30 is supported by a pair bearings 23 and 24 respectively fitted to the central openings of the drive frame 4 and the rear frame 7. The V-ribbed pulley 2 is fastened to the bearing 23 on the front end of the shaft 30 by a nut 23.

The Lundell type pole core 32 is composed of generally annular front and rear core members 35 and 36. Each of the core members 35 and 36 has a plurality of claw poles extending in parallel with the shaft 30 so that each one of the claw poles of one core member is disposed between two claw poles of another core member to enclose the rotor coil 31.

The front and rear core members 35 and 36 have center cylindrical portions 39 and 40 which form a center core of the pole core to have the rotor coil 31 wound thereon through a coil bobbin 33. The rotor core 31 magnetizes the pole core 32 when a field current is supplied thereto. The rotor coil 31 is connected to a pair of connection bars 34, which are connected to the slip rings 10. A pair of cooling fans 41 and are fixed to the front and rear surfaces the pole core 32.

A prescribed air gap G is formed between the outer periphery of the pole core 32 and the inner periphery of the stator 5.

Figure 1A:
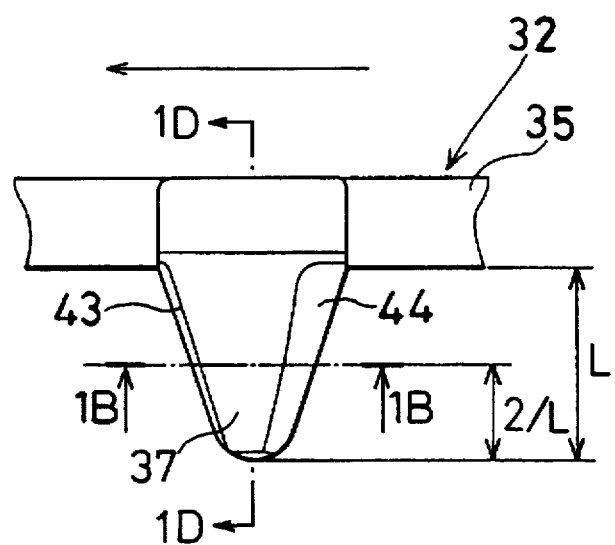
FIG. 1A is a plan view.
Figure 1B:
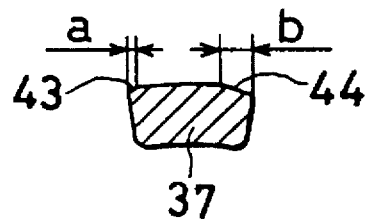
FIGS. 1B and 1C are cross-sectional views illustrating a claw pole according to an embodimant of the present invention.
Figure 1C:
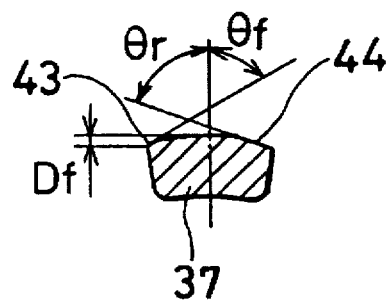
Figure 3:
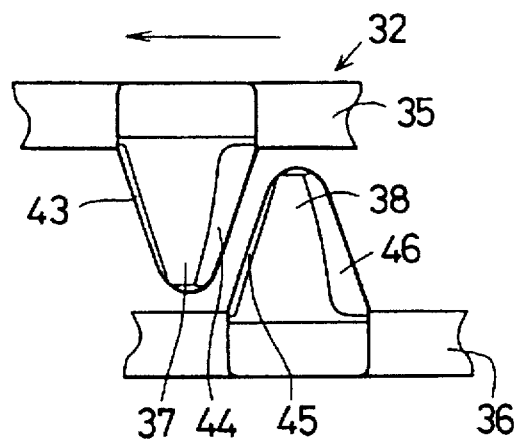
FIG. 3 is a schematic plan view illustrating a pair of claw poles according to the embodiment of the present invention.
Figure 4:
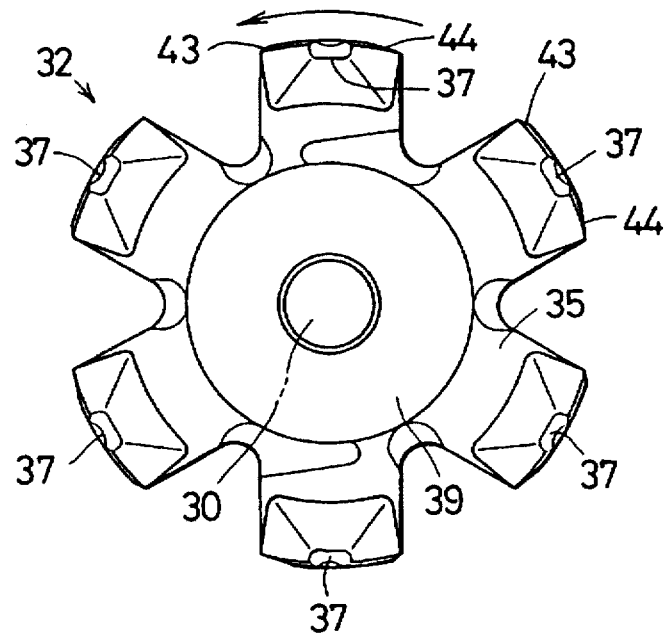
FIG. 4 is a side view illustrating the front side of a Lundell type pole core having the claw poles according to the embodiment of the present invention.
Figure 5:
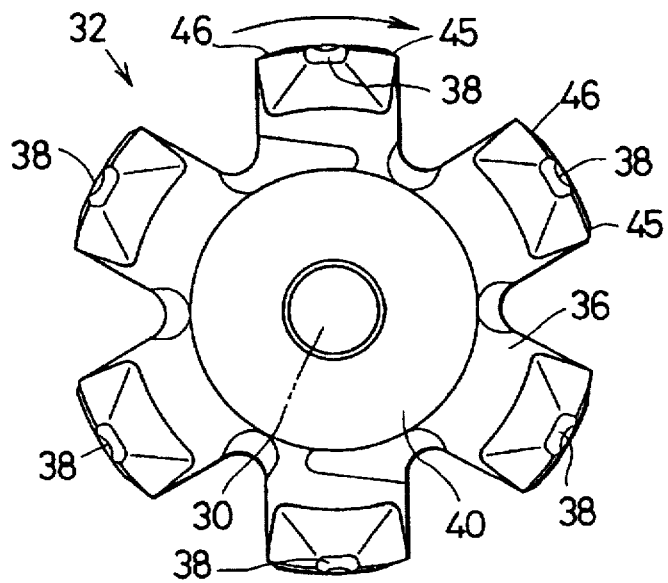
FIG. 5 is a side view illustrating the rear side of a Lundell type pole core having the claw poles according to the embodiment of the present invention.

Each of the claw poles 37 of the front core member 35 has a trapezoidal surface facing the stator 5 and both leading and trailing sides of the rotation of the rotor 6 are chamfered so that the trailing side chamfers 44 and 46 become wider than leading side chamfers 43 and 45 as shown in FIGS. 3, 4 and 5, and so that both leading and trailing side chamfers nearer the base portion of the claw poles become wider as shown in FIGS. 1A, 1B and 3, in which an arrow indicates the direction of the rotation.

The chamfers are formed on the pole core to taper off to the edges of the claw poles. As a result, the pole cores having the above chamfered claw poles can be formed by a cold-forging without machining.

A cylindrical iron member is placed in a forging die and pressed on a surface to form an intermediate pole core member having claw poles. Then, the corners of the claw poles are pressed in the direction from the edge of the claw pole to the base portion thereof by a die having corners corresponding to the chambfers. Because the chamfers are formed to taper off to the edge of the claw pole, the chamfers are formed easily.

A pair of the pole cores 32 having chamfers is fitted to the shaft with the the rotor coil 31 disposed therebetween, and the outer periphery of the claw poles are machined to have a suitable air gap between the rotor 6 and the stator 5 thereafter.

Figure 6:
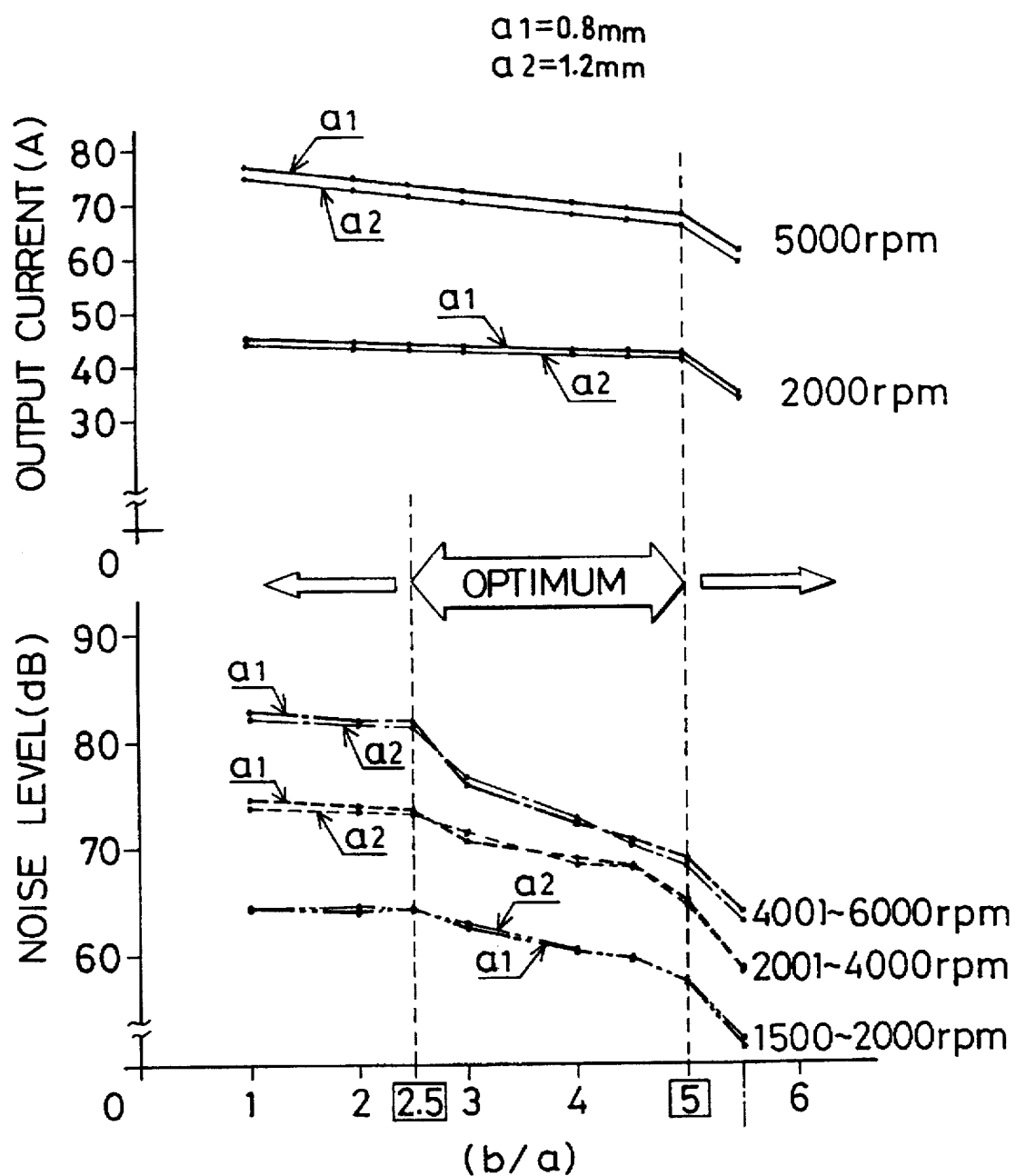
FIG. 6 is a graph showing relationships between a ratio of chamfer widths of the claw poles and the output current of an alternator and the magnetic noise of the same.

The ratio b/a of circumferential widths b and a of the chamfers between the trailing edge thereof at the middle (L/2) of the claw pole length (L) and the leading edge thereof at the same middle portion is preferably $2.5 \leq b/a \leq 5.0$ as shown in FIG. 6.

In FIG. 6, the circumferential width a of the leading chamfer 43 is sampled to have a1=0.8 mm and a2=1.2 mm. The depth Df of the leading chamfer 43 is 0.5 mm.

The output current is sampled at 2000 rpm and 5000 rpm of an alternator.

The noise level is sampled in three speed ranges of the alternator, 4001 rpm–6000 rpm, 2001 rpm–4000 rpm and 1500 rpm–2000 rpm.

It is noted that the noise level is improved without significant reduction of the output current when the chamfer ratio b/a is in the range between 2.5 and 5, particularly in the range between 3.0 and 4.5.

The chamfered angle θr° of the trailing chamfer 44 has preferably $60° \leq θr° \leq 75°$.

Figure 7:
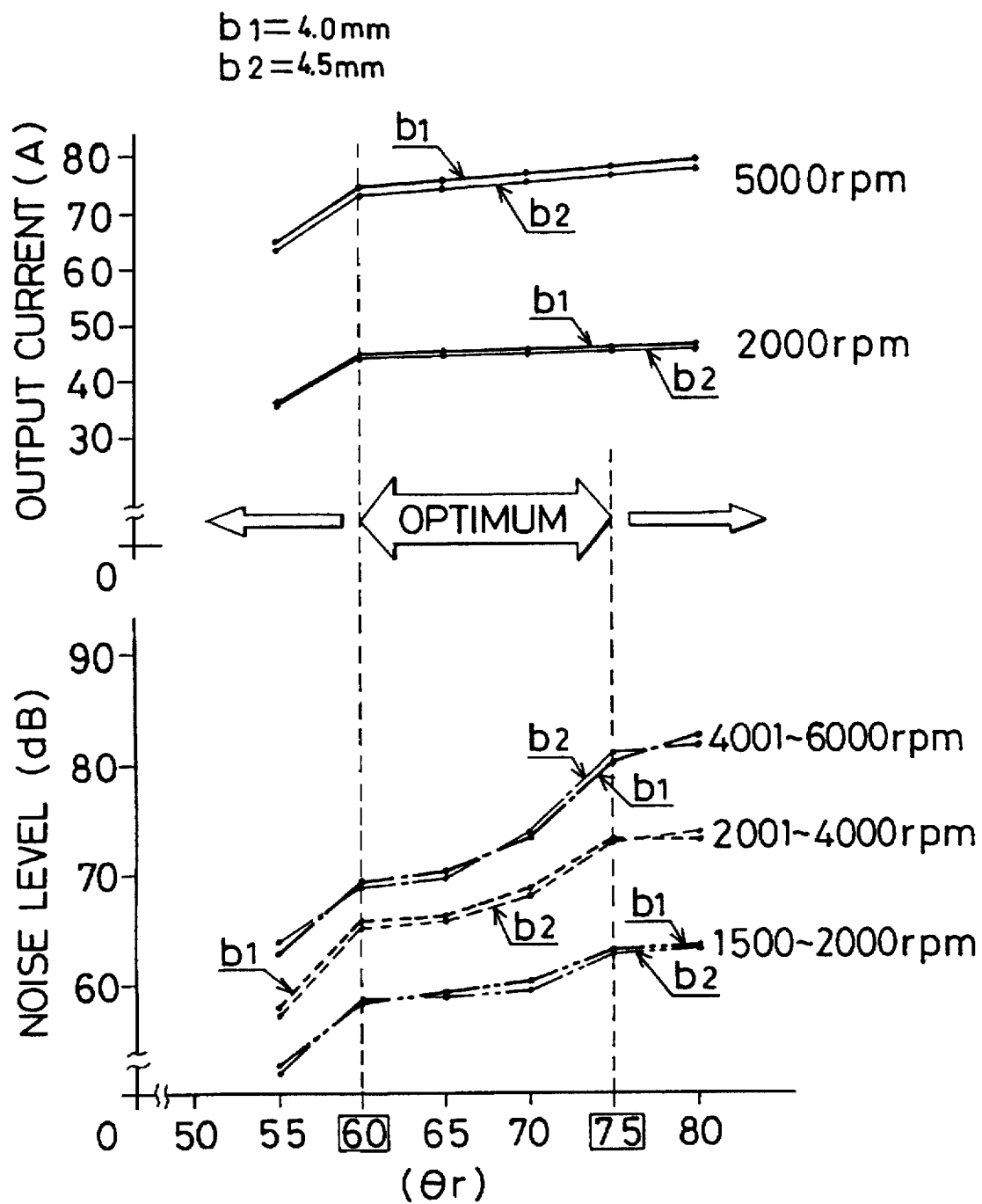
FIG. 7 is a graph showing relationships between a chamfered angle of the claw poles and the output current of an alternator or the magnetic noise of the same.

In FIG. 7, the circumferential width a of the leading chamfer 43 is sampled to have a=1.0 mm. The depth Df of the leading chamfer 43 is 0.5 mm; the circumferential width b of the trailing chamfer is sampled to have b1=4.0 and b2=4.5; and the chamfered angle θr° of the trailing chamfer 44 is changed by 5° from 50° to 80°, and the noise level (dB) and the output current (A) are sampled with the same operating condition of the alternator as that of FIG. 6.

It is noted that the noise level is improved without significant reduction of the output current when the chamfered angle θr° of the trailing chamfer 44 is in the range between 60° and 75°, particularly in the range between 60° and 65°.

The chamfered angle θf° of the leading chamfer 43 can be smaller or larger than the chamfered angle θr° of the trailing chamfer 44 as far as the chamfer ratio b/a is within the above described range.

In the forgoing description of the present invention, the invention has been described with reference to a specific embodiment thereof. It will, however, be evident that various modifications and changes may be made to the specific embodiment of the present invention without departing from the broader spirit and scope of the invention as set forth in the appended claims. Accordingly, the description of the present invention in this document is to be regarded in an illustrative, rather than restrictive, sense.

What is claimed is:

1. An AC generator including a stator, a rotor composed of a generally cylindrical pole core having a plurality of claw poles facing said stator for supplying magnetic field to said stator, wherein said claw poles have first and second chamfers disposed respectively on both leading and trailing sides thereof;

a ratio b/a between a circumferential width a of said first chamfer and a circumferential width b of said second chamfer is in a range from 2.5 to 5.0; and a chamfered angle θr° of said second chamfer is in a range from 60° to 75°.

2. An AC generator as claimed in claim 1, wherein said first and second chamfers of said pole cores have a draft tapering off to edges of said claw poles.

3. An AC generator as claimed in claim 2, wherein said claw poles have trapezoidal surface; and said first and second chamfers are wider at portions nearer the base portion of said claw poles.

4. An AC generator as claimed in claim 2, said first and second chamfers are formed by cold forging.

\* \* \* \* \*